United States Patent [19]

Mashino

[11] Patent Number: 5,021,727
[45] Date of Patent: Jun. 4, 1991

[54] ELECTRIC POWER SUPPLY SYSTEM FOR MOTOR VEHICLE

[75] Inventor: Keiichi Mashino, Katsuta, Japan
[73] Assignee: Hitachi, Ltd., Tokyo, Japan
[21] Appl. No.: 296,002
[22] Filed: Jan. 12, 1989
[30] Foreign Application Priority Data Jan. 18, 1988 [JP] Japan .................. 63-6953

[51] Int. Cl.$^5$ ............................. H02J 1/00
[52] U.S. Cl. ............................. 322/7; 322/28; 323/267
[58] Field of Search ............... 322/7, 22, 24, 25, 27, 322/28, 72, 73, 89, 90; 323/267, 282, 283

[56] References Cited

U.S. PATENT DOCUMENTS

| | | | |
|---|---|---|---|
| 3,740,569 | 6/1973 | Carcia | 323/267 X |
| 4,034,232 | 7/1977 | LaVenture | 323/283 X |
| 4,100,474 | 7/1978 | Pfeffer et al. | 322/28 X |
| 4,645,948 | 2/1987 | Morris et al. | 307/310 X |
| 4,692,684 | 9/1987 | Schaeffer | 322/90 |
| 4,694,238 | 9/1987 | Norton | 322/28 |
| 4,723,105 | 2/1988 | Matouka et al. | 322/90 X |
| 4,841,425 | 6/1989 | Maeba et al. | 323/267 X |
| 4,868,908 | 9/1989 | Pless et al. | 323/267 |

OTHER PUBLICATIONS

Jarrett et al., "Dual Voltage Electrical Systems for Future Autos", Design News, Oct. 6, 1986, pp. 140–142.

Primary Examiner—William H. Beha, Jr.
Assistant Examiner—Kristine Peckman
Attorney, Agent, or Firm—Antonelli, Terry, Stout & Kraus

[57] ABSTRACT

A power supply system for a motor vehicle includes a battery of high voltage for a load system rated at 48V and a high-voltage generator for charging the battery. Loads rated at high voltage are supplied with electric power directly from the battery. A power MOS IC element connected in parallel with the battery is controlled in accordance with a predetermined duty factor for producing at an output terminal thereof an average low voltage of 24V or 12V, wherein low-voltage loads are supplied with the low output voltage.

33 Claims, 5 Drawing Sheets

FIG. 1

(48V LOAD SYSTEM)   (12V LOAD SYSTEM)

ELECTRIC POWER SUPPLY SYSTEM FOR MOTOR VEHICLE

BACKGROUND OF THE INVENTION

The present invention relates to an electric power supply system for a motor vehicle such as a passenger car and more particularly to a dual voltage power supply system profitably suited for use as a power supply system for a motor vehicle in which the output voltage of an electric generator is boosted to permit the current capacity of wiring required for interconnection of various onboard devices to be reduced.

In the industrial field of motor vehicles such as passenger cars and others, there arises a tendency that the number of electric loads is increased as a result of efforts made to improve the comfortableness and manipulability of the vehicle, involving a problem that the onboard electrical wiring becomes very complicated. To cope with this problem, approaches for reducing the amount of wiring by boosting the source voltage are proposed in U.S. Pat. No. 4,694,238 and an article entitled "Dual Voltage Electrical Systems For Future Autos" contained in *Design News* published on Oct. 6, 1986, pp. 140–142. According to the concept of these prior art techniques, electric loads such as motor-driven actuators and the like are supplied with a high voltage of 24 V (volts) or 48 V, while a low voltage of 12 V is supplied to electric bulbs or the like which can not be rated for a high voltage because of poor vibration-withstanding capability of the filaments which would be required.

However, in the article mentioned above, no proposal is made concerning a technique for converting a voltage of a high voltage system to that of a low voltage system.

One of the most important problems encountered in realizing a high-voltage power supply system for a motor vehicle can be seen in how to implement the power supply systems of different voltages at low costs. As the device for the voltage conversion, there are heretofore known a DC-DC converter, a switching regulator and others. They are, however, very expensive.

SUMMARY OF THE INVENTION

It is an object of the present invention to provide an inexpensive electric power supply system for a motor vehicle which system is capable of generating and supplying source voltages to two systems of different voltages.

For accomplishing the above and other objects which will be more apparent in the following description, there is proposed according to an aspect of the present invention an electric system for a motor vehicle comprising an on/off switching element provided between a high voltage system and a low voltage system, and a duty cycle control circuit for generating a rectangular waveform signal for turning on and off the switching element at a predetermined duty cycle to apply to the low voltage system a lower mean voltage than that of the high voltage system. The circuits required for implementing the dual voltage power supply system according to the invention can be realized by employing only digital circuits because there is no need for feedback control of the output voltage. Thus, these circuits can easily be realized in the form of a single-chip monolithic integrated circuit (IC).

The duty cycle control circuit turns on and off the switching element at a predetermined constant frequency. When the duty cycle is represented by 1/N (where N is an integer), the mean output voltage of the switching element is 1/N of the voltage of the high voltage system.

The voltage of the high voltage system is regulated by a voltage regulator incorporated in the generator. Accordingly, the mean value of the output voltage of the switching element is controlled to be constant. Thus, it is unnecessary to perform voltage control for the low voltage system, which means that analog circuits such as comparators, filters and the like can be eliminated. The dual voltage power supply system can thus be realized with only digital circuits.

DESCRIPTION OF THE PREFERRED EMBODIMENTS

Now, the invention will be described in conjunction with a preferred embodiment thereof by first referring to FIG. 1 which shows in a schematic circuit diagram an electrical system for a motor vehicle which includes actuators such as electric motors rated at 48 V and electric bulbs such as head lights and others rated at 12 V. In this figure, a reference numeral 1 denotes an electric generator having a rated DC output voltage of 48 V and incorporating therein a voltage regulator (not shown). A numeral 2 denotes a battery which may be constituted by a lead storage battery composed of 24 cells. A reference numeral 3 denotes a load belonging to a 48-V system and supplied with electric power through a switch 31. A numeral 4 denotes a voltage converter which may be constituted by a one-chip semiconductor device designed to serve for a voltage conversion from 48 V to 12 V. Reference numerals 5 and 6 designate loads which belong to the 12-V system and are supplied with power from the output of the voltage converter 4 by way of switches 51 and 61, respectively.

Figure 1:
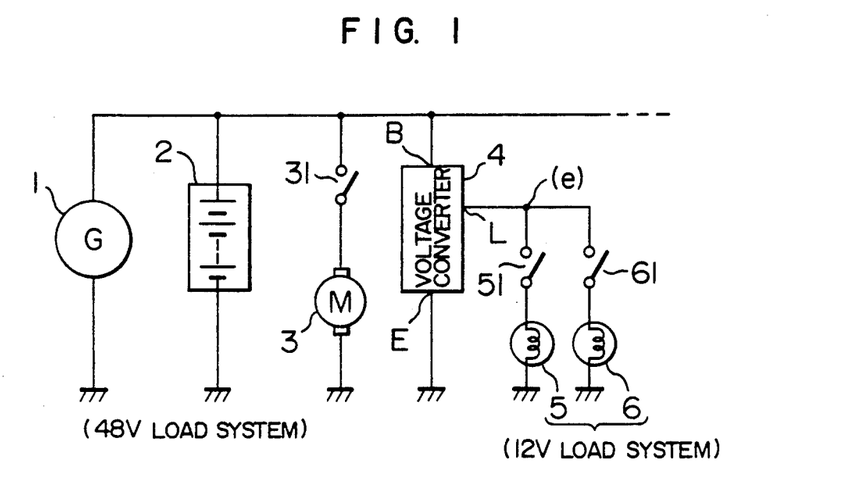
FIG. 1 is a schematic circuit diagram showing an electric system for a motor vehicle according to an embodiment of the present invention.
Figure 2:
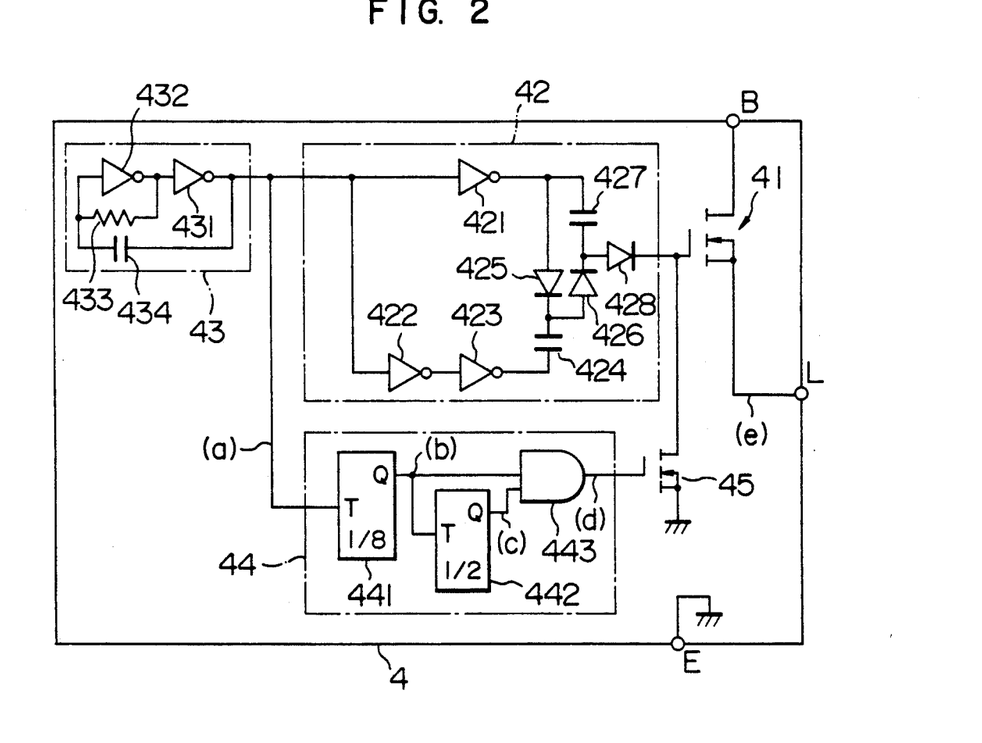
FIG. 2 is a circuit diagram showing an internal circuit configuration of a voltage converter 4 shown in FIG. 1.

FIG. 2 shows an internal circuit configuration of a voltage converter 4 shown in FIG. 1. Referring to FIG. 2, a reference numeral 41 designates an N-channel power transistor serving as a switching element for establishing and interrupting (turning on and off) the current path between terminals B and L. A numeral 42 denotes a charge pump circuit composed of NOT gates 421, 422 and 423, diodes 425, 426 and 428 and capacitors 434, 424 and 427 for supplying electric charge to a gate of the N-channel power MOS transistor 41. A numeral 43 denotes a rectangular wave oscillator circuit composed of NOT gates 431 and 432, a resistor 433 and a capacitor 434.

A reference numeral 44 denotes a duty cycle control circuit composed of a ½ frequency divider 441, a ½ frequency divider 442 and an AND gate 443. A numeral 45 denotes an N-channel MOS transistor serving for discharging the gate charge of the power MOS transistor 41.

Next, operation of the system of the structure described above will be explained. Upon rotation of an engine (not shown) of an associated motor vehicle, an electric power of 48 V is generated by the generator 1 and utilized for charging the battery 2 and supplying a power to the load 3.

Figure 3A:
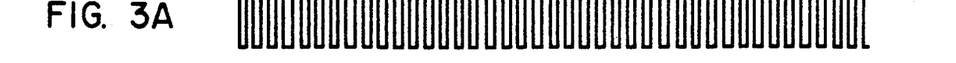
FIGS. 3A to 3E are waveform diagrams for illustrating operation of a duty cycle control circuit 44 shown in FIG. 2.
Figure 3B:
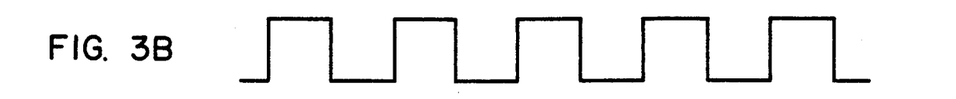
Figure 3C:
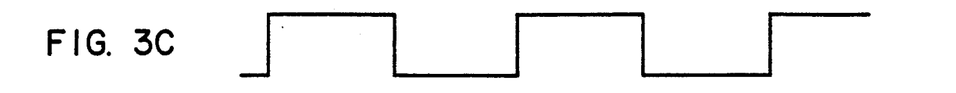
Figure 3D:
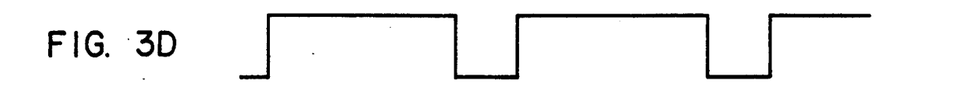

In the voltage converter 4 shown in FIG. 2, the oscillation circuit designated by the numeral 43 is an RC oscillation circuit well known in the art which oscillates with a period determined by the resistor 433 and the capacitor 434. The waveform of the output voltage (a) of this oscillator circuit 42 is illustrated in FIG. 3A. Connected to the output terminal of the oscillation circuit 43 is the charge pump circuit 42 which series as a voltage booster by making use of the fact that the outputs of the NOT gates 421 and 423 are in opposite phase, as elucidated below.

Now assuming, by way of example, that the output of the NOT gate 423 is "0" while that of the NOT gate 421 is "1" with magnitude of the output voltage thereof being represented by $V_{cc}$ (V), the capacitor 424 is charged through the diode 425, whereby a terminal voltage approximately equal to $V_{cc}$ (V) appears across the capacitor 424 after the lapse of a predetermined time. When the output phases of the NOT gates 423 and 421 are inverted such that the output of the NOT gate 423 is now "1" while that of the NOT gate 421 is "0", the anode voltage of the diode 426 assumes 2 $V_{cc}$ (V) $=V_{cc}+V_{cc}$, to thereby make the diode 426 conducting, as the result of which the electric charging is changed over to the capacitor 427. When the output phases mentioned above are again inverted, a high voltage is applied to the power MOS transistor 41 by way of the diode 428. The gate voltage of the power MOS transistor 41 is at a high voltage level when the MOS transistor 45 is in the nonconducting or off state and falls to the ground potential when the MOS transistor 45 is turned on.

Next, description will be directed to the operation of the duty control circuit 44 by referring to FIG. 3 as well. The ¼ frequency divider 441 shown in FIG. 2 divides the output frequency (FIG. 3A) of the oscillation circuit 43 by a factor of ¼ to output a signal (b) of a waveform illustrated in FIG. 3B. The output of the ¼ frequency divider 441 is inputted to the ½ frequency divider 442, whereby a signal (c) having a waveform shown in FIG. 3C is produced. The waveforms shown in FIGS. 3B and 3C are logically ANDed by the AND gate 443 which produces an output signal (d) having a waveform shown in FIG. 3D. When the output signal shown in FIG. 3D assumes the level of "0", the MOS transistor 45 is turned off, resulting in that the high voltage is applied to the gate of the power MOS transistor 41 by way of the charge pump circuit 42, whereupon the power MOS transistor 41 becomes conductive. On the other hand, when the output signal of the AND gate 443 is "1", the MOS transistor 45 is turned on to thereby turn off the power MOS transistor 41. Consequently, the output voltage (e) of the voltage converter 4 is such as illustrated in FIG. 3E. The duty ratio of the power MOS transistor 41 is given by $t_2/(t_1+t_2)$ in FIG. 3E and is ¼. Thus, the mean value of the output voltage of the voltage converter 4 having the waveform shown in FIG. 3E is 12 V=48 V/4. Thus, the mean voltage applied to the load 5 and 6 such as bulbs and the like is 12 V.

In the case of the embodiment described above, the voltage converter 4 is constitute by the power MOS transistor 41 and the digital circuits without requiring any adjustment (the oscillation frequency of the oscillator 43 needs not to be of high accuracy). Consequently, the voltage converter 4 can be implemented in the form of a monolithic integrated circuit (one-chip IC) in which the low-level signal circuits are packaged on the power MOS transistor. In this manner, interconnections are made easily and efficiently with the manufacturing cost being correspondingly lowered to great economical advantage.

Although the foregoing description has been made on the assumption that the electric system for the motor vehicle includes dual voltage systems or circuits of 48 V and 12 V, respectively, it should be understood that the dual voltage systems of 36 V and 12 V as well as 24 V and 12 V can equally be realized by resorting to such circuit configurations that the duty cycles determined by the duty cycle control circuit 44 are ⅓ and ½, respectively.

Figure 3E:
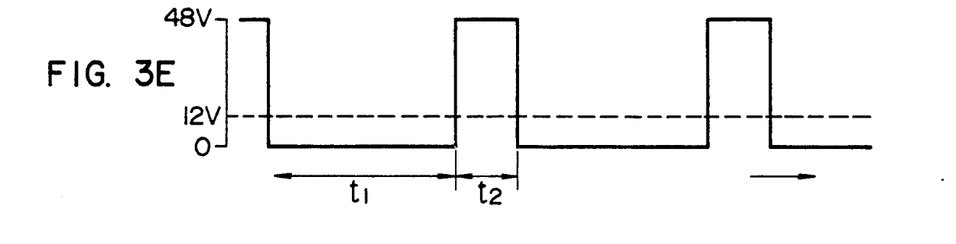
Figure 4:
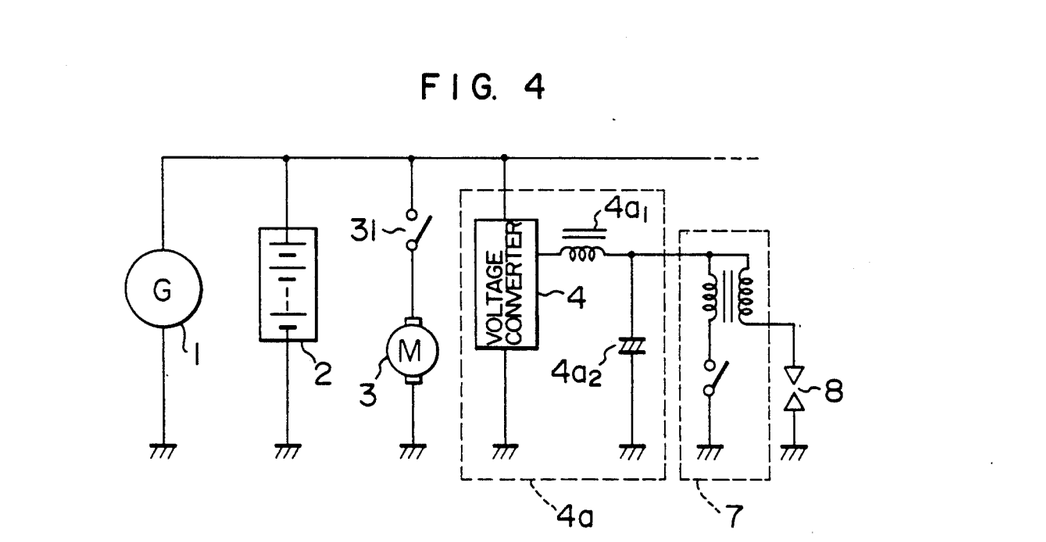
FIG. 4 is a schematic circuit diagram of the electric system for a motor vehicle according to a second embodiment of the invention.

FIG. 4 shows another embodiment of the electric system according to the present invention. In the case of the system illustrated in FIG. 1, the rectangular waveform voltage illustrated in FIG. 3E is sufficient since only the load such as the bulbs and the like is to be supplied with the voltage of 12 V. In this conjunction, it is however noted that some of other devices than the bulbs require the power supply from the 12-V system as with the case of an ignition coil having the rated voltage of 12 V which can not be realized in a 48-V rated ignition coil because of unavailableness of very thin insulated wire demanded for the implementation of such 48-V rated ignition coil. In that case, the rectangular waveform of the supply voltage may possibly involve erroneous operation of the device. In order to evade this problem, the rectangular output voltage has to be smoothed. Now turning to FIG. 4 in which the same or like parts as those shown in FIG. 1 are denoted by the like reference numerals, $4a_1$ and $4a_2$ designate a coil having a magnetic core and a capacitor, respectively, which cooperate to smooth the output voltage of the voltage converter 4. Further, reference numerals 7 and 8 designate an ignition coil and a spark plug, respectively.

In the electric system shown in FIG. 4, the voltage supplied to the ignition coil 7 is smoothed by the coil $4a_1$ and the capacitor $4a_2$, whereby the ignition coil 7 can be protected against erroneous operation. By using the capacitor $4a_2$ having a sufficiently large capacity and the oscillation circuit 43 having a sufficiently high oscillation frequency, a ripple component contained in the output voltage can be reduced. By virtue of this feature, the system shown in FIG. 4 can be employed for supplying power to a variety of loads in addition to the bulbs and the like to further advantage.

Figure 5A:
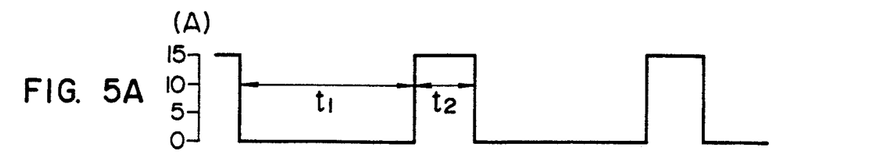
FIGS. 5A and 5B are diagrams showing, respectively, waveforms of a current and a voltage outputted from the converter 4 in the system shown in FIG. 1.
Figure 5B:
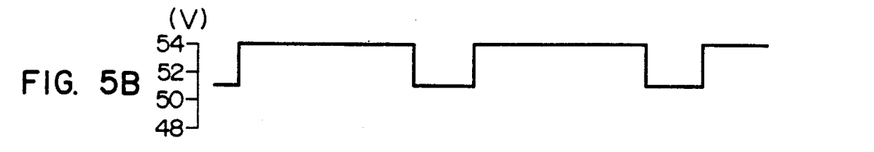

In the electric systems shown in FIGS. 1 and 4, there exist other problems to be solved, as elucidated below. FIG. 5A illustrates the waveform of a current appearing at the output terminal L of the voltage converter 4 in the electric system sown in FIG. 1. As will be seen in FIG. 5A, the current flows only during a period $t_2$ without flowing during a period $t_1$. Consequently, the waveform of the battery voltage assumes such a waveform in which the voltage is low only during the period $t_2$, as is illustrated in FIG. 5B. As the result of this, the voltage ripple is increased, giving rise to a problem. Of course, such voltage ripple can be reduced to a certain extent by using a smoothing circuit, as described hereinbefore in conjunction with FIG. 4. However, the use of the smoothing circuit can not provide the radical measures needed for solving the above problem.

Figure 6:
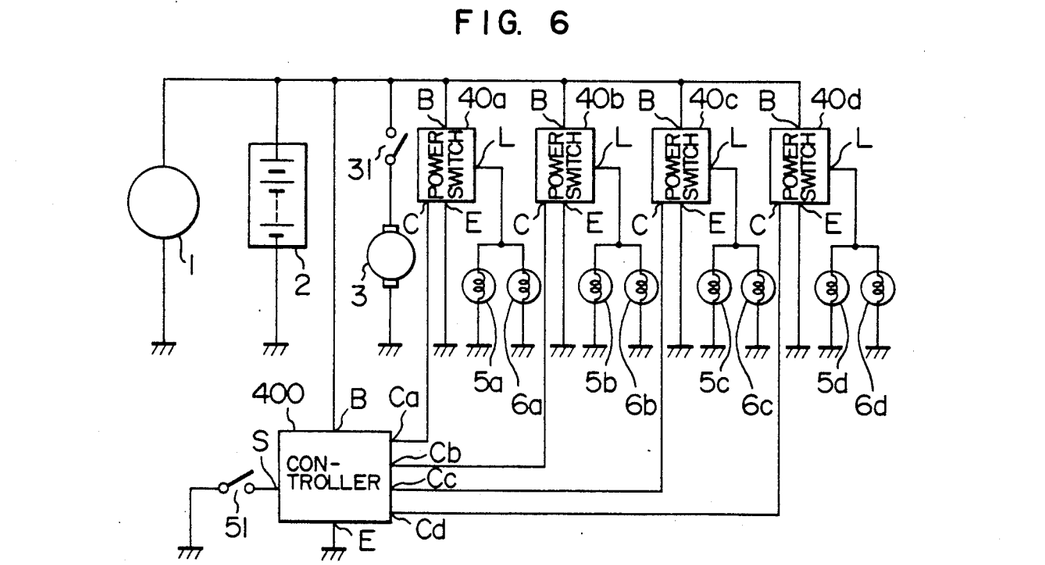
FIG. 6 is a schematic circuit diagram of the electric system for a motor vehicle according to a third embodiment of the present invention.
Figure 7:
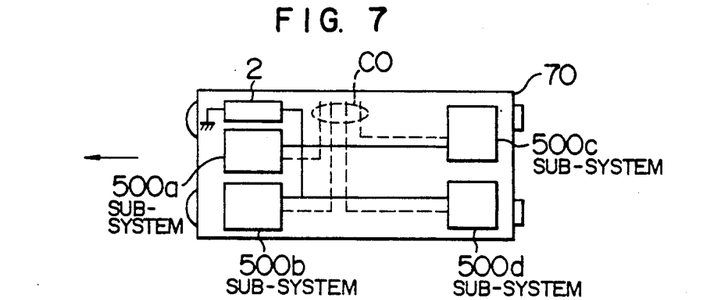
FIG. 7 is a schematic plan view of the motor vehicle for illustrating division of the electric system into four subsystems.

FIG. 6 shows an electric system according to a further embodiment of the present invention which can ensure significant suppression of the ripple voltage component. More specifically, FIG. 6 is a circuit diagram of an electric system for a motor vehicle, in which like components as those shown in FIG. 1 are designated by like reference numerals. Further, reference symbols 40a, 40b, 40c and 40d designate power switches for controlling the power supply to loads 5a, 5b, 5c, 5d, 6a, 6b, 6c and 6d, and a reference numeral 400 designates a controller. FIG. 7 is a schematic plan view of the motor vehicle. The electric system supplied with power from the battery 2 is divided into a front right subsystem 500a, a front left subsystem 500b, a rear right subsystem 500c and a rear left subsystem 500d. The front right subsystem 500a includes the power switch 40a and the loads 5a and 6a. The front subsystem 500b includes the power switch 40b and the loads 5b and 6b. The rear right subsystem 500c includes the power switch 40c and the loads 5c and 6c. Finally, the rear left subsystem 500d includes the power switch 40d and the loads 5d and 6d. A reference symbol CO designates collectively signal lines ca, cb, cc and cd.

Figure 8:
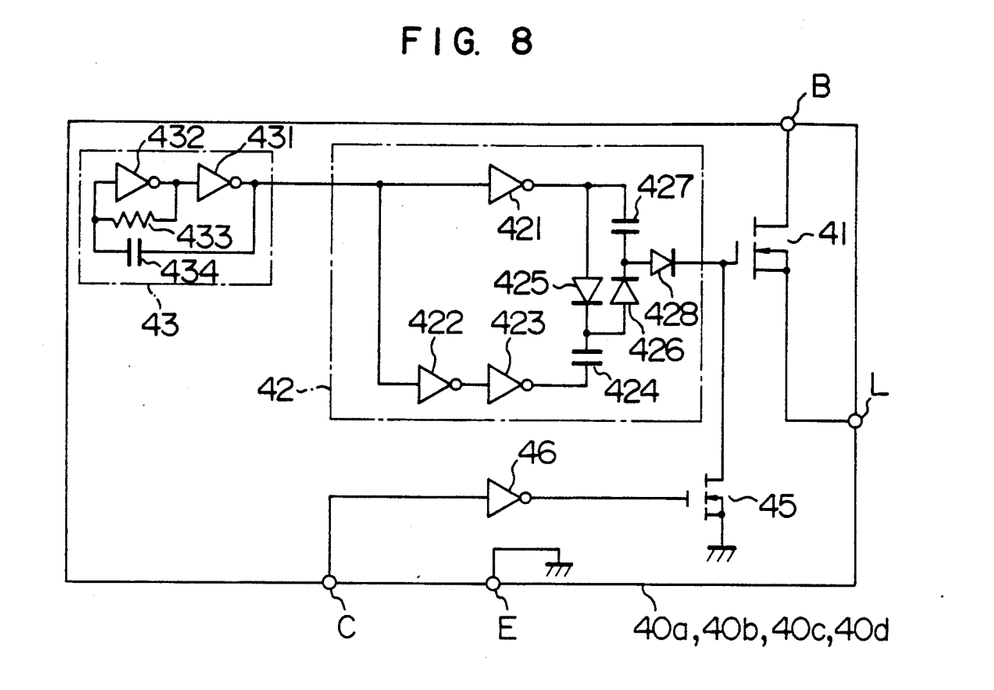
FIG. 8 is a circuit diagram showing an internal circuit configuration of a power switch 40 employed in the system shown in FIG. 6.
Figure 9:
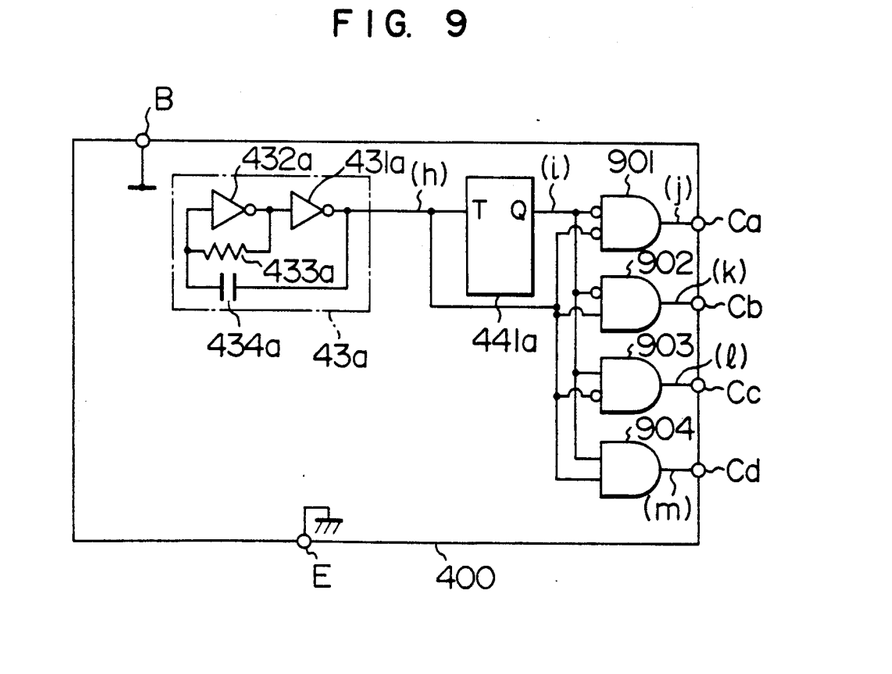
FIG. 9 is a circuit diagram of a controller 400 employed in the electric system shown in FIG. 6.
Figure 10A:
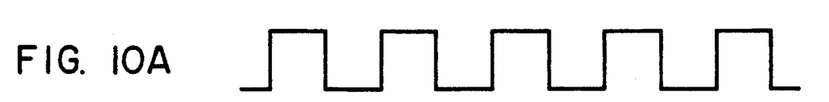
FIGS. 10A to 10G are waveform diagrams for illustrating operation of the controller 400 shown in FIG. 9.
Figure 10B:
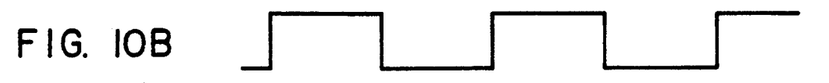
Figure 10C:
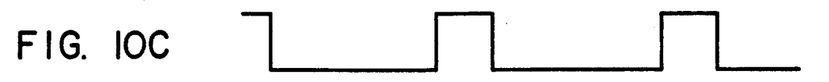
Figure 10D:
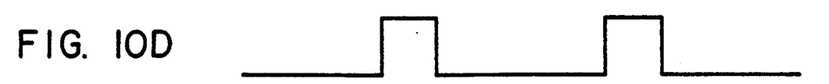
Figure 10E:
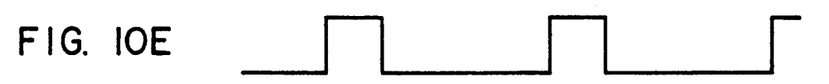
Figure 10F:
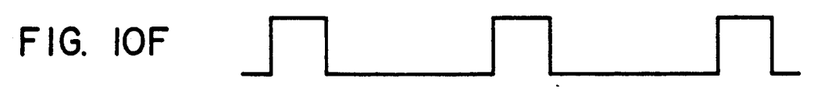
Figure 10G:
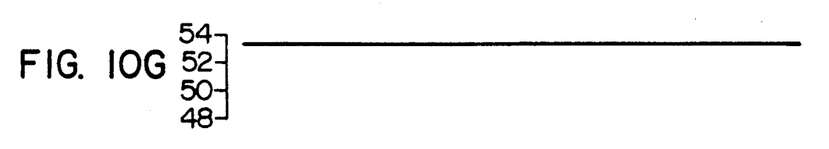

FIG. 8 shows an internal circuit configuration of the power switch 40a, 40b, 40c or 40d. As will be seen in the figure, the structure of the power switch 40a, 40b, 40c and 40d corresponds to that of the voltage converter 4 shown in FIG. 2 except that the duty control circuit 44 of the latter is replaced by a NOT gate 46. FIG. 9 shows an internal circuit configuration of the controller 400. In FIG. 9, a reference symbol 43a denotes an oscillation circuit which is composed of NOT gates 431a and 432a, a resistor 433a and a capacitor 434a for outputting a rectangular waveform signal. Further, in FIG. 9, a reference symbol 441a denotes a T flip-flop, and 901, 902, 903, and 904 designate decoder circuits, respectively. With the structure described above, such operation is performed as described below by referring to FIGS. 10A to 10E, in which FIG. 10A illustrates the waveform of output voltage (h) of the oscillation circuit 43a and FIG. 10B illustrates the waveform of voltage appearing at the output terminal (i) of the T flip-flop 441a. The binary signals shown in FIGS. 10A and 10B are decoded by the decoder circuits 901, 902, 903 and 904 to derive waveforms (j), (j), (l), and (m) which are illustrated in FIGS. 10C, 10D, 10E and 10F, respectively. When the input to the terminal "C" of the power switch 40a, 40b, 40c, 40d, is "1" the output of the associated NOT gate 46 is "0", resulting in that the MOS transistor 45 is turned off with the power MOS transistor 41 being turned on. Thus, the power switches 40d, 40c, 40b and 40a can be repeatedly turned on in this order to thereby supply the electric power to the associated loads sequentially. In this connection, it will be seen that by distributing uniformly the load currents to the four subsystems mentioned above, the current can be derived constantly at the same level from the output of the generator 1, whereby the power source ripple can be reduced remarkably to make available the DC voltage of such an ideal waveform as illustrated in FIG. 10G.

In the power supply system described above, the power source ripple can be suppressed to a minimum, whereby there is provided a stable power supply system.

As will now be appreciated from the foregoing description, the electric systems according to the invention can supply electric powers to two circuits operating at voltages differing from each other, wherein the amount of wires required for interconnections on the motor vehicle can be reduced in a facilitated manner to great economical and practical advantage.

I claim:

1. A power supply system for a motor vehicle equipped with an electric system including a first group of electrical loads having a relatively high rated voltage and a second group of electrical loads having a relatively low rated voltage, comprising:
   a generator, provided with a voltage regulator, for producing an output voltage substantially equal to said high rated voltage at an output terminal, said output terminal being connected to said first group of electrical loads;
   a switching element interposed between said output terminal of said generator and said second group of electrical loads; and
   a duty cycle control circuit for generating a rectangular waveform signal having a predetermined duty ratio for turning on said switching element with a predetermined duty factor.

2. A power supply system for a motor vehicle according to claim 1, wherein said duty cycle control circuit includes:
   an oscillation circuit;
   a group of frequency dividers for dividing the frequency of an output signal of said oscillation circuit; and
   a logic circuit for generating said rectangular waveform signal having said predetermined duty ratio in accordance with a logic combination of output signals of said group of frequency dividers.

3. A power supply system for a motor vehicle according to claim 2, wherein said switching element and said duty cycle control circuit are realized on a single semiconductor chip.

4. A power supply system for a motor vehicle according to claim 1, wherein said second group of electrical loads is divided into a plurality of subgroups, wherein switching elements are respectively interposed between said output terminal of said generator and said subgroups, and further including a distributing circuit for sequentially applying said rectangular waveform signal having said predetermined duty ratio to said switching elements.

5. A power supply system for a motor vehicle according to claim 2, wherein said second group of electrical loads is divided into a plurality of subgroups, wherein switching elements are respectively interposed between said output terminal of said generator and said subgroups, and further including a distributing circuit for sequentially applying said rectangular waveform signal having said predetermined duty ratio to said switching elements.

6. A power supply system for a motor vehicle according to claim 3, wherein said second group of electrical loads is divided into a plurality of subgroups, wherein switching elements are respectively interposed between said output terminal of said generator and said subgroups, and further including a distributing circuit for sequentially applying said rectangular waveform signal having said predetermined duty ratio to said switching elements.

7. A power supply system for a motor vehicle, comprising:
   at least one power MOS IC element connected in parallel with loads rated at a high voltage between an electrode of plus polarity of a DC high voltage source mounted on said motor vehicle and a ground;
   a group of loads rated at a low voltage and connected between at least one output terminal of said at least one power MOS IC element and said ground; and
   gate means for applying a gate signal of a predetermined frequency to at least one gate terminal of said at least one power MOS IC element.

8. A power supply system for a motor vehicle according to claim 7, further including frequency control means for controlling the frequency of said gate signal outputted from said gate means in accordance with an operation state of an engine of said motor vehicle.

9. A power supply system for a motor vehicle according to claim 7, wherein said at least one power MOS IC element is a plurality of power MOS IC elements, a respective one of said plurality of power MOS IC elements being provided for each of said loads rated at said low voltage.

10. A power supply system for a motor vehicle according to claim 2, wherein said group of frequency dividers comprises a first frequency divider for dividing said frequency of said output signal of said oscillation circuit, and a second frequency divider for dividing the frequency of an output signal of said first frequency divider; and
   wherein said logic circuit comprises an AND gate for generating said rectangular waveform signal having said predetermined duty ratio, said AND gate having a first input which receives said output signal of said first frequency divider and a second input which receives an output signal of said second frequency divider.

11. A power supply system for a motor vehicle according to claim 10, wherein said switching element comprises:
   a first MOS transistor interposed between said output terminal of said generator and said second group of electrical loads;
   a charge pump circuit connected to a gate of said first MOS transistor for turning on said first MOS transistor in response to said output signal of said oscillation circuit; and
   a second MOS transistor connected to said gate of said first MOS transistor for enabling said charge pump circuit to turn on said first MOS transistor with said predetermined duty factor in response to said rectangular waveform signal having said predetermined duty ratio.

12. In a motor vehicle, an electric system comprising:
   a voltage source;
   a first group of electrical loads having a relatively high rated voltage substantially equal to the voltage of the voltage source and connected to the voltage source;
   a second group of electrical loads having a relatively low rated voltage;
   switching means connected between the voltage source and the second group of electrical loads; and
   a duty cycle control circuit for generating a rectangular wave signal having a predetermined duty cycle for turning on and off the switching means with the predetermined duty cycle.

13. In a motor vehicle, an electric system as recited in claim 12, wherein the predetermined duty cycle is selected such that the switching means being turned on and off with the predetermined duty cycle by the duty cycle control circuit causes an effective voltage substantially equal to the low rated voltage to be supplied to the second group of electrical loads.

14. In a motor vehicle, an electric system as recited in claim 12, wherein the switching means comprises at least one switching element connected between the voltage source and the second group of electrical loads, and wherein each switching element comprises:
   a first MOS transistor connected between the voltage source and at least a portion of the second group of electrical loads;
   a charge pump circuit connected to a gate of the first MOS transistor for turning on and off the first MOS transistor; and
   a second MOS transistor connected to the gate of the first MOS transistor for enabling the charge pump circuit to turn on and off the first MOS transistor, wherein the second MOS transistor has a gate which is controlled by the rectangular wave signal having the predetermined duty cycle so as to control the second MOS transistor to enable the charge pump circuit to turn on and off the first MOS transistor with the predetermined duty cycle.

15. In a motor vehicle, an electric system as recited in claim 12, wherein the duty cycle control circuit comprises:
   an oscillation circuit;
   frequency divider means for dividing the frequency of an output signal of the oscillation circuit; and
   a logic circuit for logically combining output signals of the frequency divider means to generate the rectangular wave signal having the predetermined duty cycle.

16. In a motor vehicle, an electric system as recited in claim 12, wherein the switching means comprises one switching element connected between the voltage source and the second group of electrical loads.

17. In a motor vehicle, an electric system as recited in claim 16, further comprising an oscillation circuit, wherein the duty cycle control circuit comprises:
   a first frequency divider for dividing the frequency of an output signal of the oscillation circuit;
   a second frequency divider for dividing the frequency of an output signal of the first frequency divider; and
   an AND gate for generating the rectangular wave signal having the predetermined duty cycle, the AND gate having a first input which receives the output signal of the first frequency divider and a second input which receives an output signal of the second frequency divider; and wherein the switching element comprises:
a first MOS transistor connected between the voltage source and the second group of electrical loads;
a charge pump circuit connected to a gate of the first MOS transistor for turning on and off the first MOS transistor in response to the output signal of the oscillation circuit; and
a second MOS transistor connected to the gate of the first MOS transistor for enabling the charge pump circuit to turn on and off the first MOS transistor, wherein the second MOS transistor has a gate which receives the rectangular wave signal having the predetermined duty cycle for controlling the second MOS transistor to enable the charge pump circuit to turn on and off the first MOS transistor with the predetermined duty cycle.

18. In a motor vehicle, an electric system as recited in claim 17, wherein the oscillation circuit, the switching element, and the duty cycle control circuit are formed on a single semiconductor chip.

19. In a motor vehicle, an electric system as recited in claim 12, wherein the second group of electrical loads is divided into a plurality of subgroups of electrical loads, wherein the switching means comprises a plurality of switching elements, and wherein each switching element is connected between the voltage source and a respective one of the subgroups.

20. In a motor vehicle, an electric system as recited in claim 19, wherein the duty cycle control circuit sequentially applies the rectangular wave signal having the predetermined duty cycle to the plurality of switching elements.

21. In a motor vehicle, an electric system as recited in claim 20, wherein the duty cycle control circuit comprises:
a first oscillation circuit;
a T flip-flop for dividing the frequency of an output signal of the oscillation circuit; and
first, second, third, and fourth AND gates each having a first input which receives an output signal of the T flip-flop and a second input which receives the output signal of the first oscillation circuit, wherein the first inputs of the first and second AND gates and the second inputs of the first and third AND gates are NOT inputs; and
wherein each of the switching elements comprises:
a second oscillation circuit;
a first MOS transistor connected between the voltage source and the respective subgroup of electrical loads;
a charge pump circuit connected to a gate of the first MOS transistor for turning on and off the first MOS transistor in response to an output signal of the second oscillation circuit;
a second MOS transistor connected to the gate of the first MOS transistor for enabling the charge pump circuit to turn on and off the first MOS transistor; and
a NOT gate receiving the rectangular wave signal having the predetermined duty cycle and connected to a gate of the second MOS transistor for controlling the second MOS transistor to enable the charge pump circuit to turn on and off the first MOS transistor with the predetermined duty cycle.

22. In a motor vehicle, an electric system as recited in claim 21, wherein the second oscillation circuit, the first MOS transistor, the charge pump circuit, the second MOS transistor, and the NOT gate are formed on a single semiconductor chip.

23. A power supply system for use in a motor vehicle equipped with an electric system including a voltage source, a first group of electrical loads having a relatively high rated voltage substantially equal to the voltage of the voltage source and connected to the voltage source, and a second group of electrical loads having a relatively low rated voltage, the power supply system comprising:
switching means connected between the voltage source and the second group of electrical loads when the power supply system is being used in the motor vehicle; and
a duty cycle control circuit for generating a rectangular wave signal having a predetermined duty cycle for turning on and off the switching means with the predetermined duty cycle.

24. A power supply system as recited in claim 23, wherein the predetermined duty cycle is selected such that the switching means being turned on and off with the predetermined duty cycle by the duty cycle control circuit causes an effective voltage substantially equal to the low rated voltage to be supplied to the second group of electrical loads when the switching means is connected between the voltage source and the second group of electrical loads.

25. A power supply system as recited in claim 23, wherein the switching means comprises at least one switching element connected between the voltage source and the second group of electrical loads when the power supply system is being used in the motor vehicle, and wherein each switching element comprises:
a first MOS transistor connected between the voltage source and at least a portion of the second group of electrical loads when the power supply system is being used in the motor vehicle;
a charge pump circuit connected to a gate of the first MOS transistor for turning on and off the first MOS transistor; and
a second MOS transistor connected to the gate of the first MOS transistor for enabling the charge pump circuit to turn on and off the first MOS transistor, wherein the second MOS transistor has a gate which is controlled by the rectangular wage signal having the predetermined duty cycle so as to control the second MOS transistor to enable the charge pump circuit to turn on and off the first MOS transistor with the predetermined duty cycle.

26. A power supply system as recited in claim 23, wherein the duty cycle control circuit comprises:
an oscillation circuit;
frequency divider means for dividing the frequency of an output signal of the oscillation circuit; and
a logic circuit for logically combining output signals of the frequency divider means to generate the rectangular wave signal having the predetermined duty cycle.

27. A power supply system as recited in claim 23, wherein the switching means comprises one switching element connected between the voltage source and the second group of electrical loads when the power supply system is being used in the motor vehicle.

28. A power supply system as recited in claim 27, further comprising an oscillation circuit, wherein the duty cycle control circuit comprises:
  a first frequency divider for dividing the frequency of an output signal of the oscillation circuit;
  a second frequency divider for dividing the frequency of an output signal of the first frequency divider; and
  an AND gate for generating the rectangular wave signal having the predetermined duty cycle, the AND gate having a first input which receives the output signal of the first frequency divider and a second input which receives an output signal of the second frequency divider; and
wherein the switching element comprises:
  a first MOS transistor connected between the voltage source and the second group of electrical loads when the power supply system is being used in the motor vehicle;
  a charge pump circuit connected to a gate of the first MOS transistor for turning on and off the first MOS transistor in response to the output signal of the oscillation circuit; and
  a second MOS transistor connected to the gate of the first MOS transistor for enabling the charge pump circuit to turn on and off the first MOS transistor, wherein the second MOS transistor has a gate which receives the rectangular wave signal having the predetermined duty cycle for controlling the second MOS transistor to enable the charge pump circuit to turn on and off the first MOS transistor with the predetermined duty cycle.

29. A power supply system as recited in claim 28, wherein the oscillation circuit, the switching element, and the duty cycle control circuit are formed on a single semiconductor chip.

30. A power supply system as recited in claim 23, wherein the second group of electrical loads is divided into a plurality of subgroups of electrical loads, wherein the switching means comprises a plurality of switching elements, and wherein each switching element is connected between the voltage source and a respective one of the subgroups when the power supply system is being used in the motor vehicle.

31. A power supply system as recited in claim 30, wherein the duty cycle control circuit sequentially applies the rectangular wave signal having the predetermined duty cycle to the plurality of switching elements.

32. A power supply system as recited in claim 31, wherein the duty cycle control circuit comprises:
  a first oscillation circuit;
  a T flip-flop for dividing the frequency of an output signal of the oscillation circuit; and
  first, second, third, and fourth AND gates each having a first input which receives an output signal of the T flip-flop and a second input which receives the output signal of the first oscillation circuit, wherein the first inputs of the first and second AND gates and the second inputs of the first and third AND gates are NOT inputs; and
wherein each of the switching elements comprises:
  a second oscillation circuit;
  a first MOS transistor connected between the voltage source and the respective subgroup of electrical loads when the power supply system is being used in the motor vehicle;
  a charge pump circuit connected to a gate of the first MOS transistor for turning on and off the first MOS transistor in response to an output signal of the second oscillation circuit;
  a second MOS transistor connected to the gate of the first MOS transistor for enabling the charge pump circuit to turn on and off the first MOS transistor; and
  a NOT gate receiving the rectangular wave signal having the predetermined duty cycle and connected to a gate of the second MOS transistor for controlling the second MOS transistor to enable the charge pump circuit to turn on and off the first MOS transistor with the predetermined duty cycle.

33. A power supply system as recited in claim 32, wherein the second oscillation circuit, the first MOS transistor, the charge pump circuit, the second MOS transistor, and the NOT gate are formed on a single semiconductor chip.

* * * * *